United States Patent [19]

Burkhard

[11] Patent Number: 5,096,007
[45] Date of Patent: Mar. 17, 1992

[54] BALANCE WITH OVERLOAD PROTECTION

[75] Inventor: Hans-Rudolf Burkhard, Schwerzenbach/Schweiz, Switzerland

[73] Assignee: Mettler Toledo AG

[21] Appl. No.: 519,582

[22] Filed: May 7, 1990

[30] Foreign Application Priority Data

May 9, 1989 [CH] Switzerland ............ 1743/89

[51] Int. Cl.$^5$ .................. G01G 23/06; G01G 7/04
[52] U.S. Cl. .................... 477/187; 177/212
[58] Field of Search ............ 177/187, 188, 212, 229

[56] References Cited

U.S. PATENT DOCUMENTS

| | | | |
|---|---|---|---|
| 4,058,179 | 11/1977 | Price | 177/187 X |
| 4,273,203 | 6/1981 | Blawert et al. | 177/229 X |
| 4,930,588 | 6/1990 | Kuhlmann et al. | 177/212 |

FOREIGN PATENT DOCUMENTS 7935202 5/1980 Fed. Rep. of Germany.

Primary Examiner—George H. Miller, Jr.
Attorney, Agent, or Firm—Toren, McGeady & Associates

[57] ABSTRACT

A balance with a weighing cell includes a measurement transducer with a short travel distance and a device for protecting the load cell against dynamic and static overload. The protecting device includes a spring mounted in the flux of force between the load application and the load cell and a travel-limiting stop member fixably attached to a housing. A connecting member is inserted in series to the spring in a suspension unit. The connecting member is mounted so as to be biased by the spring against the suspension unit in the direction in which force is introduced and is fastened so as to be raisable from the suspension unit when force is introduced. The connecting member is connected to the transmission lever.

13 Claims, 2 Drawing Sheets

BALANCE WITH OVERLOAD PROTECTION

BACKGROUND OF THE INVENTION

1. Field of the Invention

The present invention relates to a balance with a weighing cell including a measurement transducer with a short travel distance and a device for protecting the load cell against dynamic and static overload. The protecting device includes a spring mounted in the flux of force between the load application and the load cell and a travel-limiting stop member fixedly attached to a housing.

2. Description of the Related Art

Each balance is designed for a predetermined load range which may not be exceeded or only slightly exceeded. In order to protect balances against damage, they are usually equipped with an overload protecting device which includes a stop member which prevents, for example, a plastic deformation or which generally prevents that a predetermined travel path of the load receiving means is exceeded. Such overload protections which consist of a stop member become fully effective when the maximum load is slowly or statically exceeded and the balance mechanism is protected by limiting travel by means of the stop member. However, in cases of dynamic overloads, for example, when a load is dropped onto the weighing dish, a stop member is no longer sufficient because the acceleration forces subject the balance mechanism during the initial 20 to 40 ms to tension forces as well as to compression forces which may lead to damage of the balance.

German Utility Model 79 35 202 discloses an overload protection for a balance with electromagnetic load compensation in which the load receiving means is supported on the suspension unit with a compression spring being mounted between the load receiving means and the suspension unit. When a high dynamic load is applied to the weighing dish, the load receiving means can slide downwardly on a stop member while overcoming the spring force in the suspension unit, and, thus, the suspension unit with the balance mechanism is protected against the impact which has been produced, i.e., the suspension unit with the balance mechanism is protected against the primary effect of the dynamic overload. When the spring untensions, which occurs within milliseconds, the load receiving means is thrown in the opposite direction as a result of the secondary effect of the dynamic overload and the impact of the load receiving means against the suspension unit may result in upsetting-type damage of coupling members or other components of the balance mechanism.

It is, therefore, the primary object of the present invention to provide an overload protection for balances having a load cell including an instrument transformer with a short travel distance, in which the balance mechanism is protected against the primary effect as well as against the secondary effect of a dynamic overload.

SUMMARY OF THE INVENTION

In accordance with the present invention, the above-described object is met by an arrangement in which a connecting member is inserted in series to the spring in a suspension unit acting as load receiving means, wherein the connecting member is mounted so as to be biased by the spring against the suspension unit in the direction in which force is introduced and the connecting member is fastened so as to be raisable from the suspension unit when force is introduced, and wherein the connecting member is connected to the transmission lever.

As a result of the division of the mass of the suspension unit, it is ensured that no tensile loads or compressive loads can act on the sensitive components of the balance mechanism which exceed loads which would damage the components. The mass constructed as a pivoting member and inserted between the spring and the suspension unit constitutes only a fraction of the remaining mass of the suspension unit, thereby facilitating a compact construction of the overload protection and permitting mounting of the overload protection within the suspension unit.

In accordance with a particularly advantageous feature of the invention, the connecting member is pivotally hinged to the suspension. If the pivot axis is additionally located in the plane of the support surfaces of the connecting member on the suspension unit, bending moments acting on the system after the return pivoting movement (no overload) can be completely avoided.

If the compression spring or springs are not only connected to each other at the bottom thereof by means of the connecting member, but are at the top thereof placed in a common support member, the entire preassembled unit can be inserted in the housing, positioned and connected to the bending bearings. An adjusting screw mounted in the support member facilitates a problem-free adjustment of the initial tension of the spring or springs.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENT

Figure 1:
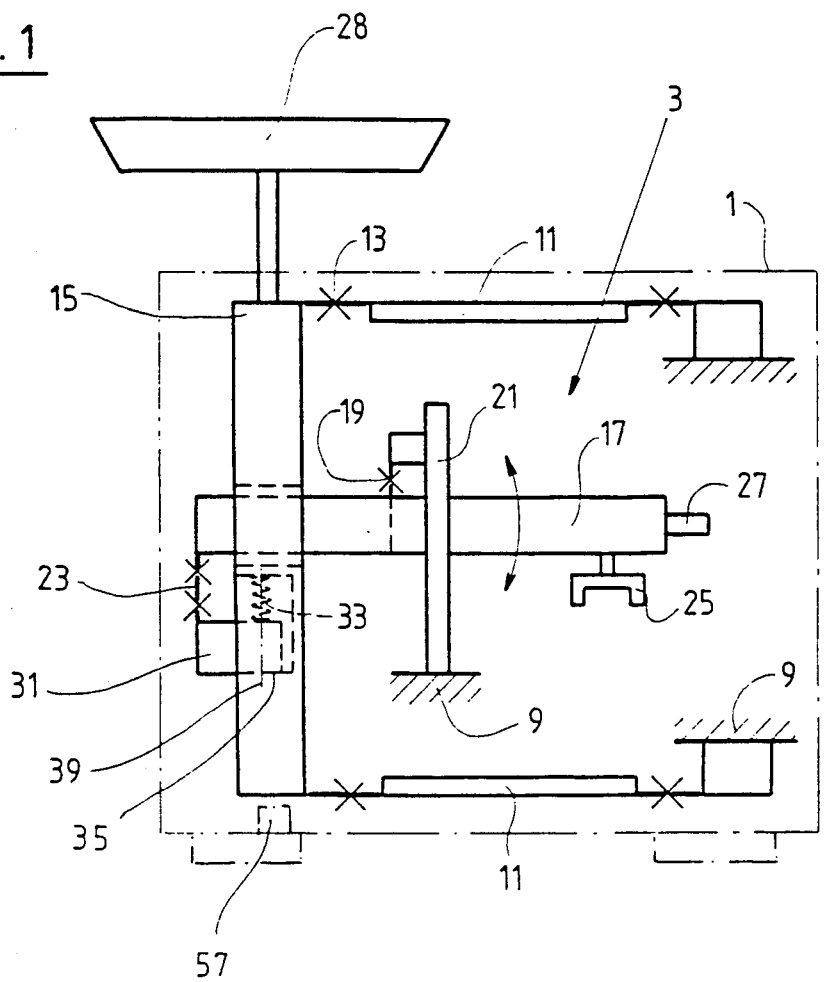
FIG. 1 is a schematic elevational view of a balance with a weighing cell including a measurement transducer with short travel distance.

As illustrated in FIG. 1 of the drawing, a balance housing 1 shown in dash-dot lines surrounds the balance mechanism and electronic unit 3 as well as the balance frame which is generally denoted by reference numeral 9. A suspension unit 15 acting as load receiving means is guided in and parallel to balance frames 9 through connecting rods 11 and bearings 13. A transmission lever or balance beam 17 is pivotally suspended from a bracket 21 through a bending bearing 19. An end of transmission lever 17 is fastened to the suspension unit 15 through a coupling member 23. The transmission lever 17 has near its other end a plunger-type coil 25 which is insertable in a stationary permanent magnet system of known construction which, for simplicity's sake, is not illustrated. A lug 27 symbolically illustrates a conventional position scanning. The weighing dish 28 is placed on the suspension unit 15.

A connecting member 31 is mounted in the suspension unit 15. The top of the connecting member 31 is pressed against a contact surface 35 of the suspension unit 15 by means of a compression spring 33. The coupling member 23 is fastened on the side of connecting member 31. The coupling member 23 transmits the vertical movement from the suspension unit 15 to the transmission lever 17.

The mass of the connecting member 31 is preferably only about 10% of the mass of the suspension unit 15.

Figure 2:
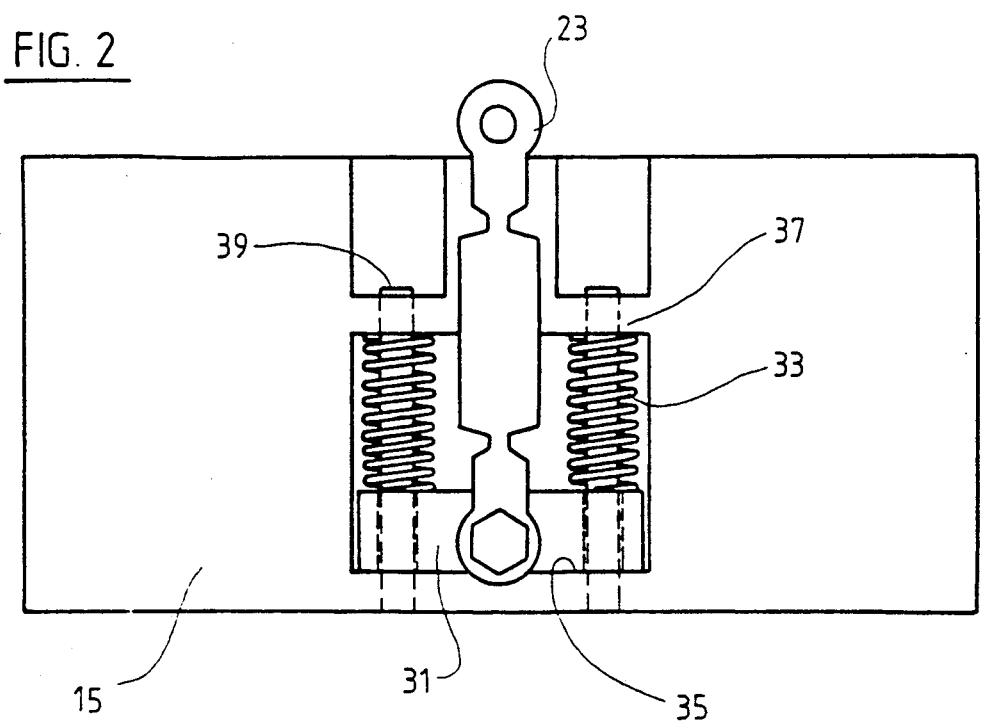
FIG. 2 is a side view of a first embodiment of a suspension unit.

As can be clearly seen in FIG. 2, the connecting member 31 is longitudinally slidably guided by means of two guide bolts 39 which are vertically inserted between the contact surface 35 and an upper support 37. The two compression springs 33 can also be guided on the guide bolts 39 and are mounted with initial tension between the upper support 37 and the connecting member 31.

Figure 3:
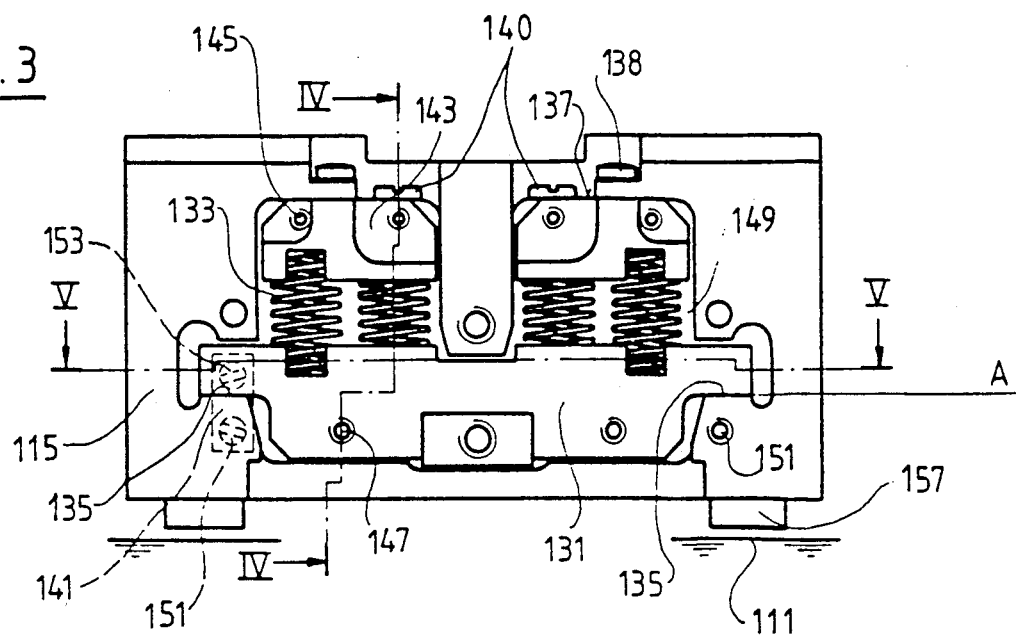
FIG. 3 is a side view of a second embodiment of the suspension unit.
Figure 4:
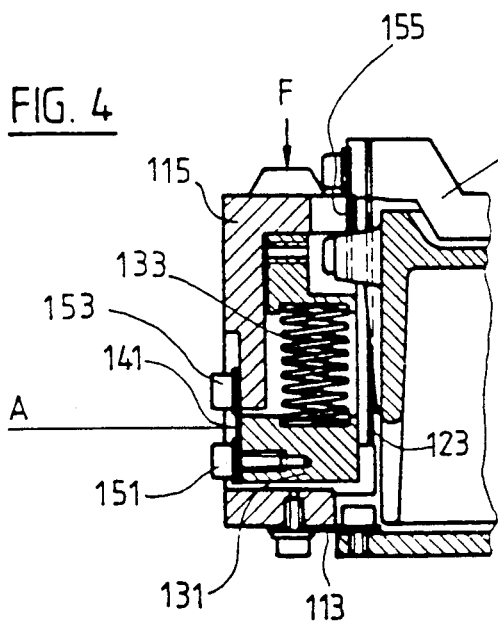
FIG. 4 is a sectional view taken along sectional line IV—IV in FIG. 3.
Figure 5:
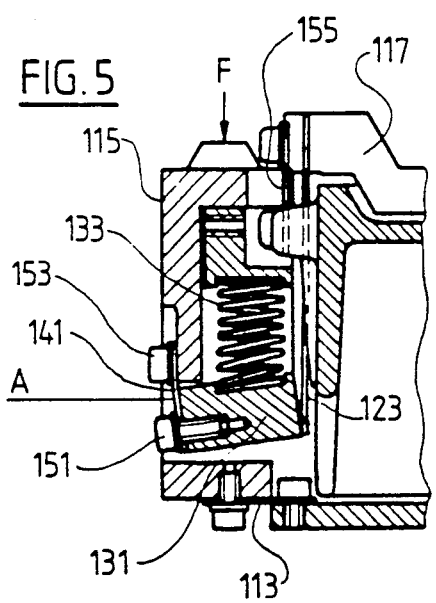
FIG. 5 is a sectional view corresponding to FIG. 4, however, with a pivoted connecting member.
Figure 6:
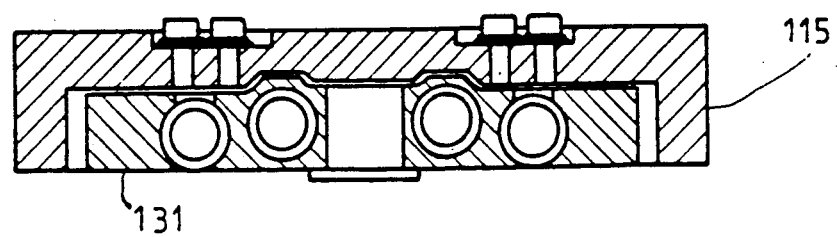
FIG. 6 is a sectional view taken along sectional line V—V in FIG. 3.

In accordance with another advantageous embodiment of the invention illustrated in FIGS. 3 to 5, the connecting member 131 is pivotally connected to the suspension unit 115 by means of two bending bearings 141. Four helical springs 133 are mounted in a tensioned state between the connecting member 131 and the upper support 137. The springs 133 may rest directly against the upper support 137 or, as shown in FIGS. 3 and 4, may be mounted in a support member 143 which is provided with bores 145 which make possible the insertion of an assembly tool for a simple pretensioning and assembly and positioning within the suspension unit 115

In the embodiment shown in FIGS. 3 to 6, the connecting member 131 rests on two spaced-apart contact surfaces 135 which are located laterally outside the outer springs 133 and, additionally, are located in the same plane A as the bending lines of the bending bearings 141, as can be seen in FIGS. 3 and 4.

The connecting member 131, the compression springs 133 of which one, two or four are provided depending on the rated load of the balance and the construction of the balance, and the support member 143, are all mounted completely within the contours of the suspension unit 115. Accordingly, if necessary, the overload protection device can be mounted in already existing balance structures.

For mounting the device in the suspension unit 115, the latter is pretensioned in an assembly device, not shown, and is held by means of bolts which are inserted in bores 145 of the support member 143, on one hand, and in bores 147 of the connecting member 131, on the other hand. After the device has been placed in the suspension unit 115, the initial tension can be cancelled and the device can be clamped to the contact surfaces 135 and the upper support 137. In addition, the initial tension of the compression springs 133 can be adjusted by means of one or more adjusting screws 140 and, thus, the overload protection device can be adjusted to the weighing range of the balance. The support member 143 is fastened to the suspension unit 115 by means of screws 138.

After the protection device has been inserted, the bending bearings 141 can be fastened by means of screws 151 to the connecting member 131 and by means of screws 153 to the suspension unit 115. The coupling member 123 is fastened on that side of the connecting member 131 which faces away from the bending bearing 141. In FIG. 3, the bending bearing 141 is shown only on one side and in broken lines.

In addition to the arrangement of the bending bearing 141 and the coupling member 123, FIG. 4 further illustrates a vertical bearing 155 supporting to the transmission lever 117 to which the force is introduced by the coupling member 123 which is subjected to tensile load during the weighing procedure. The upper connecting rod with the upper bending member 113 is not visible in the sectional view taken along sectional line IV—IV.

Stop members 157 are arranged at the bottom edge of the suspension unit 115. The stop members 157 limit the travel of the suspension unit 15 and rest against housings 111 when an overload occurs.

The operation of the overload protection device according to the present invention shall be explained in the following in the case of a load which falls freely onto the weighing dish, wherein the weight of the load may also be smaller than the maximum permissible weight of the balance.

When the load hits the weighing dish, the impulse is transmitted from the weighing dish through the suspension unit 15, 115 as a tensile force to the coupling member 23, 123 and from there to the transmission lever 17, 117. The spring 33, 133 which is arranged in the line of flux of the force stores a portion of the energy Which has been introduced, so that the impulse is transmitted to the connecting member 31, 131 after having been substantially dampened and is transmitted from the connecting member 31, 131 to the coupling member 23, 123 and the transmission lever 17, 117. During the introduction of the dynamic force, the connecting member 31, 131, is raised from the contact surface 35, 135 and, in the embodiment of FIG. 5, is simultaneously pivoted. The pivoting movement of the connecting member 131 is illustrated exaggerated in FIG. 5 and occurs around an imaginary axis in the bending bearing 141. As a result of the pivoting movement, the connecting member 131 assumes an inclined position and the springs 133 are compressed. Consequently, the coupling member 123 is moved in a dampened manner only by a distance which results from the travel path of the suspension unit 115 minus the travel path of the connecting member 131 at the connecting point with the coupling member 123.

The energy stored in springs 33, 133 immediately returns the connecting member 31, 131 into the position of rest so that the connecting member 31, 131 impacts on the contact surfaces 35, 135 of the suspension unit 15, 115. The mass of the member 31, 131 which is substantially smaller in relation to the mass of the suspension unit 15, 115 is capable of accelerating the tension unit 15, 115 when the impact occurs only to an extremely limited extent, so that the return travel path of the suspension unit 15, 115 is negligibly small. A harmful upsetting-type load on the coupling member 23, 123 and the vertical bearing 155 as a result of the impact of the connecting member 31, 131 on the suspension unit 15, 115 can be avoided.

Thus, the upsetting force acting on the bending bearings and/or coupling members in conventional overload protection devices are negligibly small in the overload protection according to the present invention.

While specific embodiments of the invention have been shown and described in detail to illustrate the application of the inventive principles, it will be understood that the invention may be embodied otherwise without departing from such principles.

I CLAIM:

1. In a balance having a weighing cell including a measurement transducer with a short travel distance and a device for protecting the load cell against dynamic and static overload, the protecting device including spring means mounted in a flux of force between a load application location and the load cell, and a travel-limiting stop member fixedly attached to a housing, the improvement comprising a suspension unit acting as load-receiving means, a connecting member mounted in series to the spring means in the suspension unit, wherein the connecting member is mounted so as to be biased by the spring means against the suspension unit in direction in which force is introduced, and wherein the connecting member is fastened so as to be raisable from the suspension unit when force is introduced, and means for connecting the connecting member to a transmission lever.

2. The balance according to claim 1, comprising at least one upper support means and at least one lower support surface, the connecting member and the spring means being mounted between the at least one upper support means and the at least one lower support surface.

3. The balance according to claim 2, comprising a support member resting against the upper support means, the spring means engaging the support member.

4. The balance according to claim 3, comprising an adjusting screw for tensioning the spring means.

5. The balance according to claim 3, the connecting member and the support member comprising means to be received in an assembly device and for tensioning.

6. The balance according to claim 1, wherein the suspension unit includes a recess, the spring means and the connecting member being mounted in the recess.

7. The balance according to claim 1, the balance having a maximum permissible load, the spring means having an initial tension which is greater than the maximum permissible load of the balance.

8. The balance according to claim 1, wherein the connecting member is mounted so as to be slidable along at least one guide bolt.

9. The balance according to claim 1, wherein the spring means is mounted so as to be slidable along at least one guide bolt.

10. The balance according to claim 1, wherein the connecting member is pivotally hinged to the suspension unit.

11. The balance according to claim 7, wherein the connecting member is connected to the suspension unit by means of at least one bending bearing.

12. The balance according to claim 8, wherein the balance comprises laterally provided support surfaces, the connecting member having ends, the ends of the connecting member being supported on the support surface.

13. The balance according to claim 12, wherein the support surfaces define a plane, the bending bearing having a bending line, the bending line extending in the plane of the bearing surfaces.

* * * * *